Patented Feb. 8, 1938

2,107,765

UNITED STATES PATENT OFFICE 2,107,765

WATER TREATMENT

Hugh Rodman, Oakmont, Pa., assignor to Rodman Chemical Company, Verona, Pa., a corporation of Pennsylvania No Drawing. Application February 18, 1936, Serial No. 64,515

5 Claims. (Cl. 210—9)

This invention relates to water treatment, more particularly to the purification of water for domestic purposes, i. e., for drinking and cooking.

It is among the objects of the invention to treat water to remove objectionable tastes and odors and render the water palatable and of good keeping quality by a procedure which is simple, efficient, inexpensive, and which may be combined with existing water treating processes to further improve the quality of the treated water without substantially increasing the treating costs and without requiring substantial change in apparatus.

Many waters are objectionable for domestic uses because of the presence of objectionable tastes and odors. This is true not only of natural waters, especially those contaminated by mill effluents and other industrial wastes, but also of treated waters, such as those supplied by public service and municipal corporations, this unpleasant characteristic being due to agents carried by the water, or to the treating agents used in preparing the water for use, or to a combination thereof.

In my Patent No. 1,933,567, granted November 7, 1933, I have disclosed and claimed a process of removing objectionable tastes and odors from water in accordance with which the water is agitated with finely divided coal or coal coke in an amount and for a time to remove the unpalatable constituents, after which suspended matter is separated from the water. Tests have shown that procedure to be highly efficient in removing objectionable tastes and odors, as well as coloring matter, and to render the water highly palatable and pleasant for drinking and for cooking purposes. Moreover, the treatment disclosed in my patent confers good keeping qualities upon the water so treated. Additionally, it may be used to advantage, if desired, in conjunction with standard processes of treating water, such as filtration procedures or procedures involving treatment with clarifying, germicidal, or softening agents, and without materially increasing the expense of the treatment.

The process disclosed in my aforesaid patent is entirely operative, and may be applied satisfactorily to the treatment of water to increase its potability. I have now discovered, however, and it is upon this that the present invention is predicated, that the benefits of the invention disclosed in my Patent No. 1,933,567 may be retained while effecting substantial economies in treating costs, by the use of finely divided pitch coke or oil coke instead of the coal or coal coke disclosed in that patent. More particularly, I have found that by contacting water with finely divided pitch coke or oil coke the resultant water is as satisfactory in character as that produced by the treatment described in my aforesaid patent, while in contrast therewith, greatly reduced quantities of the treating agent suffice to accomplish the same ends, with consequent very substantial economies in treating costs.

In accordance with the present invention the water to be treated is intimately contacted with finely divided pitch coke or oil coke in an amount and for a time to effect the desired result. Advantageously this is accomplished by suspending the pitch coke or oil coke in and agitating it with the water. After exposure of the water to the coke for a period of time productive of removal of objectionable taste and odor the suspended matter is separated from the water in any suitable manner.

The pitch coke or oil coke should be finely divided, advantageously to a point at which most of it will pass at least a 200-mesh standard sieve. The benefits of this subdivision are that the finer the pitch coke or oil coke the more rapidly the result is attained, and also less material is needed than where coarse material is used. Relatively small amounts of these materials are required to render palatable waters which are initially highly offensive to the palate. As far as I have been able to determine, there appears to be no limiting proportionality between the weights of water and pitch coke or oil coke used, and in fact no limits can be stated since these will vary with the water, any accompanying treatment of the water, and the degree of sub-division of the pitch coke or oil coke. It may be said, however, that by prolonging the time of contact of the water and the pitch coke or coal coke very small amounts of the latter may be used, and, as noted above, the action is accelerated or smaller amounts of the cokes may be used by increasing the sub-division of the treating agent.

I have discovered that for the purposes of the invention ordinary commercial oil cokes and pitch cokes should be subjected to a preliminary heat treatment, i. e., by heating the coke to an elevated temperature. For most purposes it suffices to heat the coke to 1700° F. or higher. Preferably this heat treatment is accomplished in closed containers where the pitch coke or oil coke is finely divided or in not too coarse form. Where the material is initially in the form of large lumps the heating may be carried out in other types of apparatus, as in rotary kilns. It will be recognized that such simple heating does not create activating conditions. After the material has cooled it is sub-divided in any desired manner, for instance in a ball mill, and preferably so that most of it will pass a 200-mesh standard sieve.

Unpleasant odors and tastes may be removed from water by simple treatment with such pitch coke or oil coke, the resulting water being of markedly improved palatability. Such water may or may not be sterile depending upon its previous history and treatment. However, the process provided by this invention may be combined to advantage with other procedures applied to water for particular purposes. Thus, it may be combined with any of the well known chlorine and the like treatments whose purpose is to sterilize water. I now prefer to use permangate as an adjunct to the pitch coke and oil coke whose use characterizes this invention. The combined use of a germicide and pitch coke or oil coke is preferred because the use of the former agents appears further to improve the quality of the water. Where the invention is practiced in connection with chlorination desirable results follow its practice as a result of the minimizing of the taste and odor due to chlorine, which are objectionable to many people, and where it is combined with permanganate treatments the pinkish or muddy color due to permanganate is eliminated with production of crystal clear water. The process may also be used in conjunction with standard coagulant or softening treatments.

As illustrative of the benefits to be derived from the practice of the invention, reference may be made to tests of a municipal water drawn from the Allegheny River. In consequence of the low rate of flow of that river and the particularly high contamination by industrial waste the water is especially foul in the raw state. To prepare the water for delivery to the consumer it is treated with lime and alum, in the usual manner, and is passed through sand filters and chlorinated. As drawn from the tap the treated water has an objectionable taste and odor, and at times this may be so strong as to render the water quite offensive for drinking purposes.

To gallon lots of this water I added potassium permanganate in an amount equivalent to 3 grams per thousand gallons, followed by stirring for a minute or more, until the permanganate had reacted with the water, leaving a residual pink coloration. To individual gallon samples there were then added coal coke as disclosed in my aforesaid patent, activated carbon, and oil coke and pitch coke as used in the practice of this invention, these materials being ground so that most of each material passed a 200-mesh standard screen. The various materials were added, with agitation for about a minute, up to the point where the pink color due to the residual permanganate disappeared, and the water, after filtration, was tasteless and odorless. The amounts needed and the approximate costs of the treatments are given in the following table:

| Agent | Water | |
|---|---|---|
| | 1,000 gallons | Approx. cost per 1,000 gals. |
| | Grams | Cents |
| $KMnO_4$ | 3 | .1 |
| Coal coke | 3,000 | 3.0 |
| Oil coke | 1,000 | 1.0 |
| Pitch-coke | 600 | .6 |
| Act. carbon | 200 | 5.0 |

It will be observed that 3000 grams of coal coke per thousand gallons of water were necessary to achieve the desired result. In contrast, however, one-third that amount of oil coke, and one-fifth that amount of pitch coke, sufficed to produce the same result with the substantially lower treating cost shown in the table. These tests show that the invention of my aforesaid patent is operative and satisfactory, but that similar results are obtainable at much lower material cost through the use of oil coke or pitch coke in accordance with the present invention. Treating costs are reduced further through this invention by virtue of the smaller amount of suspended matter that has to be removed.

Although extremely small amounts of activated carbon suffice to produce the same result, it will be observed that the cost is almost double that where coal coke is used, and five to eight times that of the present invention. This, however, is not the only objection to the use of activated carbon for this purpose. According to my experiences the use of commercially available activated carbons in treating water causes the water to develop a greenish, moss-like deposit upon storage, and this deposit forms even though the water has been concurrently treated with germicidal agents. Therefore, not only is the use of activated carbon so expensive as to render its application to this purpose economically impracticable, but the water also is of low keeping quality.

It has been known for many years that the sorptive capacity of carbons, particularly carbons resulting from the distillation of coals, petroleum, pitches, nut shells, and the like, may be increased greatly by carefully controlled heating of the carbons in the presence of mild oxidizing agents such as carbon dioxide and steam. It is accepted in the art that the initially low sorptive capacity of carbons is due to the presence of adsorbed, or occluded, hydrocarbons, and that the great increase in sorptive capacity which results from the treatment just stated is due to removal of such occluded hydrocarbons, probably largely by differential oxidation thereof without material oxidation of the carbon itself. Such carbons which have been treated to remove occluded hydrocarbons to confer great sorptive capacity are known in the art as "activated carbons," and it is in this sense that the term is used herein.

The effectiveness of pitch coke and oil coke heat treated in accordance with the present invention, by simple heating in a closed container, is not due, as far as I have been able to determine, to activation similar to that of activated carbon. Although this simple heat treatment renders the pitch coke and oil coke especially effective in improving the quality of drinking water in accordance with the present invention, it does not confer upon these materials the high power of clarifying liquids and adsorbing condensable gases which is possessed by true activated carbons. Such pitch coke and oil coke used in the practice of this invention are therefore designated herein and in the appended claims as being "non-activated" to distinguish them from true activated carbons. Thus, if the powdered pitch coke or oil coke is subjected to treatments which activate most forms of carbons, as by being rabbled at 1800° F. in contact with carbon dioxide and steam, it is much less effective in removing the color of permanganate solution and in improving the quality of the water than where it is merely heated in a closed container, a treatment which does not activate carbon, particularly carbons containing volatile hydrocarbon gases. Moreover, as noted hereinabove, water treated with true activated carbon develops, on standing, a greenish moss-like deposit, which does not occur in the practice of this invention using non-activated pitch coke and oil coke. It is clear, therefore, that the functioning of pitch coke and oil coke in this invention is different from that of activated carbon.

In the foregoing tests the process provided by the invention was applied to the treatment of tap water, not to raw natural water, and although it could be applied to raw water, I now believe that the cost of purifying raw, contaminated water with pitch coke or oil coke would be too high for most purposes. However, the treatment with the agents which characterize the invention, may advantageously be applied with or following the usual commercial water treatments, as indicated hereinabove. These latter commonly comprise the trapping of suspended solids, as by filtration or by the use of a flocculating agent followed by filtration, this step being combined with or followed by the addition of chlorine for destroying pathogenic bacteria. Water purified in this way is clear and sufficiently free from harmful bacteria, but it is frequently of bad taste and objectionable odor, especially where raw water is contaminated by certain industrial wastes which are difficult to remove completely. By combining with such treatments the process provided by this invention, preferably applied after the usual water treatment, the water can be made tasteless and odorless and therefore more palatable, especially for home consumption.

Tap water as used in the foregoing tests sells for approximately forty cents per thousand gallons to the small consumer, which represents a cost of about ten cents per ton for treated water at the tap. The process provided by this invention does not increase the cost of that treatment more than a fraction of a cent per ton, and the advantage of having the water wholly palatable outweighs this small increase in treating cost.

According to the provisions of the patent statutes, I have explained the principle of and mode of practicing my invention and have described what I now consider to represent its best embodiment. However, I desire to have it understood that, within the scope of the appended claims, the invention may be practiced otherwise than as specifically described.

I claim:
1. In a process of treating water to render it potable, the steps comprising intimately contacting the water with a minor proportion of finely divided non-activated material of the group pitch coke and oil coke previously heated to at least about 1700° F., said material being used in an amount and for a time to remove objectionable substances from the water, and separating the water from solid matter.

2. In a process of treating water to render it potable, the steps comprising adding a permanganate to the water and agitating it with a minor proportion of non-activated material of the group pitch coke and oil coke previously heated to at least about 1700° F., said material being ground to preponderantly pass a 200-mesh screen and being used in an amount and for a time to remove objectionable substances from the water, and separating the water from solid matter.

3. In a process of treating water with a germicidal, clarifying or softening agent, the steps comprising agitating the water with a minor proportion of suspended finely divided non-activated material of the group pitch coke and oil coke previously heated to at least about 1700° F., the material being in an amount and used for a time to render the water odorless, tasteless and of good keeping quality, and thereafter separating the water from suspended solids.

4. In a process of treating water to render it potable, the steps comprising intimately contacting the water with a non-activated material of the group pitch coke and oil coke previously heated to an elevated temperature, said material being used in an amount and for a time to remove objectionable substances from the water, and separating the water from solid matter.

5. A process of treating water to render it potable, comprising adding a permanganate to the water and intimately contacting it with finely divided non-activated material of the group pitch coke and oil coke previously heated to an elevated temperature, said material being used in an amount and for a time to remove objectionable substances, and thereafter separating the water from solids.

HUGH RODMAN.